(12) United States Patent
Isemura et al.

(10) Patent No.: US 6,463,512 B2
(45) Date of Patent: Oct. 8, 2002

(54) STORAGE DEVICE, METHOD OF PROCESSING STORED DATA, AND IMAGE FORMING APPARATUS

(75) Inventors: Keizo Isemura, Koganei; Mitsuo Nimura, Kashiwa; Noriaki Matsui, Toride; Ichiro Sasaki, Toride; Manabu Yamauchi, Toride; Naoto Watanabe, Kashiwa; Tomoyasu Yoshikawa; Satoshi Okawa, both of Toride, all of (JP)

(73) Assignee: Canon Kabushiki Kaisha (JP)

( * ) Notice: Subject to any disclaimer, the term of this patent is extended or adjusted under 35 U.S.C. 154(b) by 45 days.

(21) Appl. No.: 09/772,279

(22) Filed: Jan. 29, 2001

(65) Prior Publication Data

US 2001/0023471 A1 Sep. 20, 2001

(30) Foreign Application Priority Data

Jan. 28, 2000 (JP) ........................................ 2000-019956

(51) Int. Cl.$^7$ ............................................... G06F 15/00
(52) U.S. Cl. ...................... 711/160; 711/161; 711/162; 711/101; 707/205; 714/5; 714/6; 714/7; 358/1.16; 358/1.17; 358/1.4
(58) Field of Search ................................. 711/160, 161, 711/162, 101; 358/1.16, 1.17, 1.4; 707/205; 714/5–7

(56) References Cited

U.S. PATENT DOCUMENTS

| | | | | |
|---|---|---|---|---|
| 5,276,867 A | * | 1/1994 | Kenley et al. | 707/204 |
| 5,423,038 A | * | 6/1995 | Davis | 709/303 |
| 5,963,713 A | * | 10/1999 | Inose et al. | 395/104 |
| 6,119,721 A | * | 9/2000 | Watanabe et al. | 137/487.5 |

* cited by examiner

Primary Examiner—Do Hyun Yoo
Assistant Examiner—Mehdi Namazi
(74) Attorney, Agent, or Firm—Rossi & Associates

(57) ABSTRACT

The present invention aims at restoring backup data in a predetermined order and avoiding damage from being given to the system even when the backup data are destroyed. Flags Ferr and Feeprom and a variable i stored in a DRAM are initialized (S1 to S3). When the variable i is smaller than the number n of EEPROMs (hereinafter referred to as "PROM(s)"), the ID code of a PROM in question is read and loaded into the DRAM (S4 to S6). When the variable i equals the number n, the variable i is cleared (S7). Then, a variable j is initialized (S9), and it is determined whether or not each PROM ID stored in the DRAM matches with a mask ROM ID until the variable j becomes greater than the number n of PROMs (S11). If the answer is "No", the variable j is incremented (S13), while if "Yes," a number corresponding to the variable j then assumed is loaded into the DRAM as the flag Feeprom (S14). Data in the PROM in question is transferred to an area of the DRAM in which is stored the PROM ID matching with the mask ROM ID.

15 Claims, 7 Drawing Sheets

STORAGE DEVICE, METHOD OF PROCESSING STORED DATA, AND IMAGE FORMING APPARATUS

BACKGROUND OF THE INVENTION

1. Field of the Invention

The present invention relates to a storage device, a method of processing stored data and an image forming apparatus, and more particularly to a storage device which is capable of storing so-called backup data, a method of processing stored data so as to restore the stored data, and an image forming apparatus equipped with the storage device.

2. Description of the Related Art

Various systems, such as an image forming apparatus typically represented by a copying machine, are equipped with a semiconductor storage device capable of reading and writing data, and these systems read stored data from the storage device and write new data to the storage device.

As conventional storage elements for this type of storage device, volatile memories such as a dynamic RAM (Dynamic Random Access Memory; hereinafter referred to as "DRAM") and a static RAM (Static Random Access Memory; hereinafter referred to as "SRAM") have been used.

However, while these volatile memories have an advantage of reading and writing data at high speed, they cannot hold data stored therein when supply of the source voltage is interrupted. Thus, to keep the data stored in the memory in the event that the external power supply is stopped, the system needs to have a backup power supply incorporated therein, and this leads to an increased cost.

Further, the backup power supply is usually formed of a battery, capacitors, and other parts, and how long the volatile memory can be supplied from the power supply depends on the capacity of the battery and the capacity of the capacitors, thus limiting the stored data holding time of the memory.

To give a solution to this inconvenience, a nonvolatile memory capable of rewriting data is now used.

As the nonvolatile memory, a fixed memory such as a mask ROM (Mask Read-Only Memory) that allows data to be written during a semiconductor fabrication process thereof but cannot erase stored data has been generally used. However, the mask ROM is recently replaced by an EEPROM (Electrically Erasable and Programmable Read-Only Memory) that can electrically erase and write data over hundreds to tens of thousands of times.

The EEPROM can hold stored data even when supply of power is stopped, whereby the system is no longer required to have an incorporated backup power supply. Further, the data within the EEPROM can be electrically erased and rewritten, whereby the stored data can be modified with the EEPROM residing in the system.

However, the EEPROM needs a longer time in rewriting data than volatile memories such as a DRAM, and hence is not suitable for systems demanding high speed updating of data.

To overcome this shortcoming, a backup storage device is used, which is composed of both the above-mentioned volatile memory and the EEPROM as the nonvolatile memory to complement each other for their drawbacks.

As long as source voltage is supplied from an external source, this storage device expands data stored in the EEPROM onto the volatile memory at corresponding addresses, and when the system requests to read and write the stored data, the volatile memory processes such requests. Further, when the system requests to back up the data expanded on the volatile memory and/or to stop supply of the source voltage from the external source, the storage device writes the data expanded on the volatile memory back into the EEPROM, whereby the system holds the stored data.

The storage device having both types of memories, the volatile memory and the EEPROM, has a plurality of EEPROMs since the storage capacity of a single EEPROM may not be large enough to back up all desired stored data. Further, its volatile memory is divided into a plurality of memory areas, and data stored in the divided memory areas are sequentially transferred to the EEPROMs for storage in such a manner that data in each divided memory area is transferred to each of the EEPROMs, whereby the storage device backs up the stored data.

Further, when data stored in one of the EEPROMs are destroyed for some internal or external causes, the destroyed data in the EEPROM in question is expanded onto one of the memory areas of the volatile memory and stored there as unintelligible undefined data. As a result, a system provided with a motor or an actuator in particular is likely to undergo a runaway, a malfunction or the like.

Thus, when the stored data within any of the EEPROMs is destroyed for some cause as mentioned above, a technique is also used to expand onto the volatile memory initial data stored in a fixed memory such as a mask ROM within the storage device.

However, in the above-mentioned conventional storage device, the plurality of EEPROMs provided in the storage device for backup of data have their addresses not correlated to those of the volatile memory, and hence, when the stored data in the volatile memory are backed up in the EEPROMS, they are written to arbitrary EEPROMs. Therefore, if all the EEPROMs having stored backup data are detached from the storage device body, the EEPROMS are remounted into the storage device in an arbitrary order, and the backup data in the reattached EEPROMs are expanded onto the volatile memory, the volatile memory is likely to store at each of their addresses data that is different from what it was at the same address before the backup, thus adversely affecting the system.

Further, in the above-mentioned conventional storage device, the initial data pre-stored in the mask ROM is expanded onto all the memory areas of the volatile memory even if data in only one of the EEPROMs is destroyed, and thus it takes time to restore the data.

Furthermore, when an image forming apparatus, such as a copying machine, is used as a system on which the above storage device is mounted, it uses variable data including the count of copies and printouts produced, the size and direction of papers stored in sheet feed cassettes and correcting values and user-set values, for example. Even when external power supply to the storage device storing these variable data is interrupted, these variable data must be retained in the storage device so that the storage device can start its operation smoothly when the power supply is again started. Thus, special measures must be taken to enable the storage device used in the image forming apparatus to cope even with the interruption of its external power supply.

SUMMARY OF THE INVENTION

The present invention has been made in view of these circumstances, and it is therefore an object of the present invention to provide a storage device, a method of processing stored data, and an image forming apparatus, which are capable of restoring backup data in a predetermined order and avoiding damage from being given to the system even when the backup data are destroyed.

To attain the above object, in a first aspect of the present invention, there is provided a storage device comprising first storage means used exclusively for reading stored data, second storage means formed of a volatile memory and being capable of reading and writing the stored data, and a plurality of third storage means formed of nonvolatile memories for holding the stored data in the second storage means as backup data, wherein the plurality of third storage means has respective identifiers unique thereto, and each of the first and second storage means is divided into a plurality of storage areas corresponding in number to at least a number of the plurality of third storage means, the storage areas obtained by dividing the first storage means having respective identifiers unique thereto, and the storage device comprises loading means for loading each of the identifiers unique to the plurality of third storage means into one of the storage areas obtained by dividing the second storage means, collating means for collating the identifiers unique to the third storage means stored in the second storage means with the identifiers unique to the storage areas obtained by dividing the first storage means, and stored data transfer means for transferring contents in the third storage means which are related to one of the identifiers unique to the third storage means to one of the storage areas of the second storage means when the collating means determines that the one of the identifiers unique to the third storage means matches with one of the identifiers unique to the storage areas obtained by dividing the first storage means.

Preferably, the collating means sequentially collates the identifiers unique to the third storage means stored in the second storage means with the identifiers unique to the divided storage areas of the first storage means.

Also preferably, the storage device comprises an abnormality diagnosing means for determining whether or not any of the plurality of third storage means is abnormal, upon completion of collation of all of the identifiers unique to the third storage means with all of the identifiers unique to the divided storage areas of the first storage means by the collating means.

More preferably, the abnormality diagnosing means comprises determining means for determining whether or not stored data in one of the divided storage areas of the second storage means matches with the identifier of a corresponding one of the plurality of third storage means, and abnormality determining means for determining that the corresponding one of the plurality of third storage means is abnormal when a result of the determination made by the determining means is negative.

Preferably, the storage device comprises display means for displaying a result of the determination made by the abnormal diagnosing means.

Also preferably, the storage device comprises an alarming means for sounding an alarm when the abnormality diagnosing means determines that any of the plurality of third storage means is abnormal.

The plurality of third storage means are dismountably mounted in the main body of the storage device.

Further, to attain the above object, in a second aspect of the present invention, there is provided a method of processing stored data in a storage device including first read-only storage means for use in reading stored data, second storage means formed of a volatile memory and capable of reading data stored therein and writing data thereinto, a plurality of third storage means formed of nonvolatile memories for holding the data stored in the second storage means as backup data, each of the plurality of third storage means has an identifier unique thereto, and each of the first and second storage means is divided into a plurality of divided storage areas corresponding at least to a number of third storage means, each of the divided storage areas having an identifier unique thereto, the method comprising a loading step of loading the identifiers unique to the plurality of third storage means into the divided storage areas of the second storage means, a collating step of collating each of the identifiers unique to the third storage means stored in the second storage means with each of the identifiers unique to the divided storage areas of the first storage means, and a stored data transfer step of transferring contents in the third storage means which are related to one of the identifiers unique to the third storage means to one of the divided storage areas of the second storage means which has an identifier identical with the one of the identifiers unique to the third storage means when it is determined in the collating step that the one of the identifiers unique to the third storage means matches with the one of the identifiers unique to the divided storage areas of the first storage means.

With the above arrangements of the first and second aspects, according to the present invention, it is determined whether or not the identifier of each of the plurality of third storage means matches with the identifier of any of the plurality of divided storage areas of the second storage means, and when the former matches with the latter, backup data in the third storage means is expanded onto the divided storage area of the second storage means. As a result, even if the plurality of third storage means are mounted in the storage device body in an arbitrary order, the possibility that the system such as an image forming apparatus is damaged can be avoided.

That is, even in the case where the data stored in the second storage means are backed up in the plurality of third storage means, and the third storage means are detached from the storage device body and then remounted into the storage device body in an order different from that at the time of their detachment, the data can be easily restored to what they were before their backup, in the second storage means. As a result, even when a serviceman or the like mistakes the proper order of mounting of the plurality of third storage means, the system such as an image forming apparatus can be operated without damage.

Further, in a third aspect of the present invention, there is provided an image forming apparatus provided with the above storage device.

Still further, since the storage device is thus provided with the abnormality detecting means, any of the plurality of third storage means whose backup data is destroyed can be located easily.

The above and other objects, features and advantages of the present invention will become more apparent from the following detailed description taken in conjunction with the accompanying drawings.

DETAILED DESCRIPTION OF THE PREFERRED EMBODIMENTS

The present invention will now be described in detail with reference to the drawings showing embodiments thereof.

Figure 1:
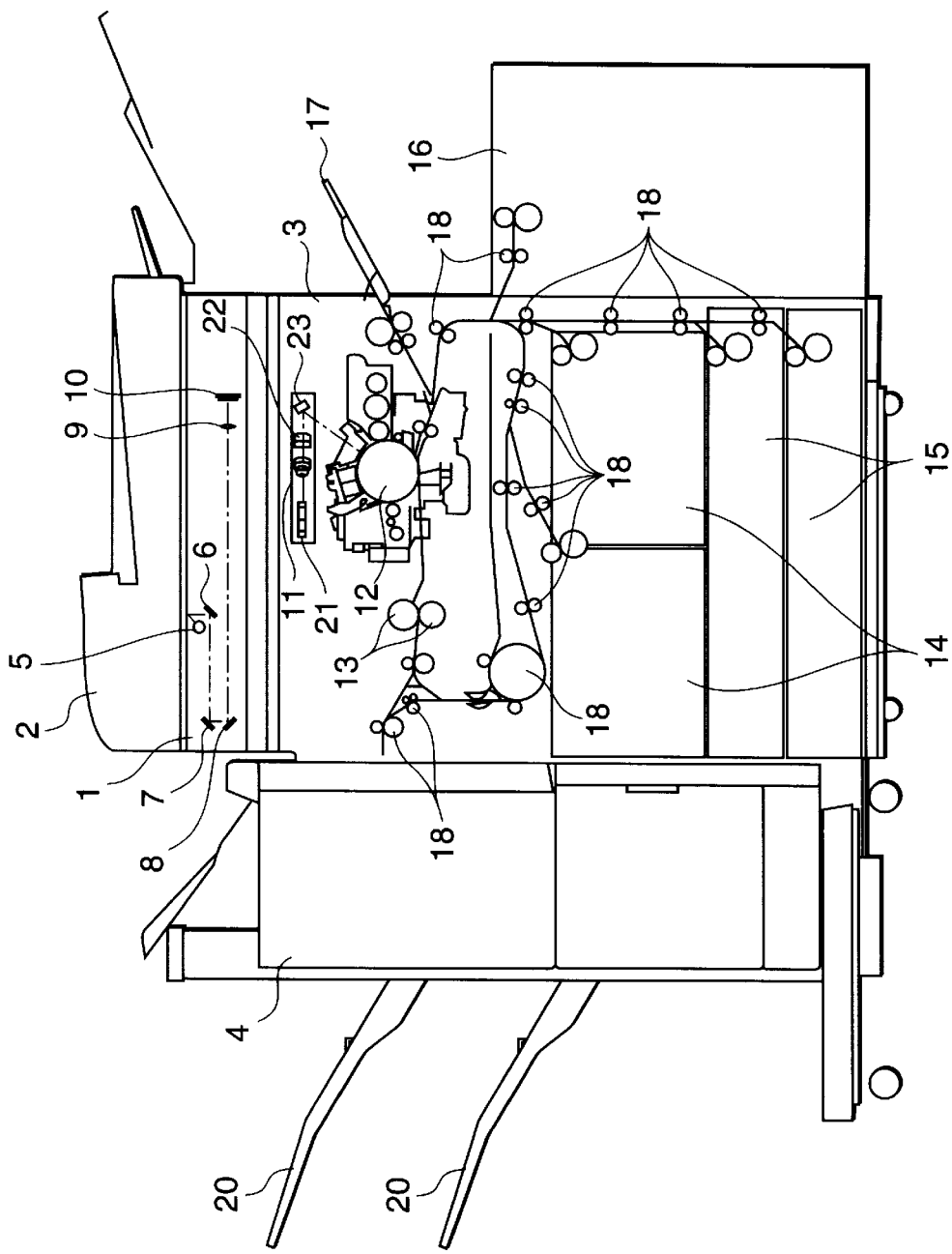
FIG. 1 is a diagram showing the internal construction of a digital copying machine as an image forming apparatus according to an embodiment of the present invention.

FIG. 1 is a diagram showing the internal construction of a digital copying machine as an image forming apparatus according to an embodiment of the present invention. The digital copying machine is comprised of an image input section 1 that reads image data depicted on a original, an automatic original feeder 2 disposed on the image input section 1, an image forming section 3 that outputs the image data onto recording sheets, and a sorter 4 that sorts recording sheets from the image forming section 3 into a plurality of bins and discharges the same.

Further, the image input section 1 has a light source 5 that scans an original placed on an original table by injecting a beam of light thereover, mirrors 6 to 8 arranged along an optical path of light injected from the light source 5 and reflected from the original, a lens 9 at which the light from the mirrors 6 to 8 converges, and a CCD 10 that forms an image from the light transmitted through the lens 9.

The image forming section 3 includes an optical projector 11 that emits a laser beam corresponding to an output from the image input section 1, a photosensitive drum 12 irradiated with the laser beam from the optical projector 11, fixing rollers 13 that fix image data transferred onto recording sheets through the photosensitive drum 12, sheet feed trays 14 and 15 containing recording sheets, a sheet feed deck 16 capable of storing a large volume of recording sheets, a manual sheet-insertion tray 17 that facilitates the feeding of special recording sheets such as OHP, thick, and postcard-sized sheets, and an appropriate number of feeding rollers 18 disposed along a feeding path. Further, sheet discharge trays 20 discharge recording sheets sorted by the sorter 4.

The optical projector 11 has a polygon mirror 21, lenses 22, and a reflecting mirror 23.

In the digital copying machine constructed as above, the light source 5 is driven by an optical system motor, not shown, to make reciprocating motions in right and left directions. The light from the light source 5 which is reflected from the original forms an image at the CCD 10 through the mirrors 6 to 8 and the lens 9 which are driven in unison with the light source 5. The CCD 10 further converts the thus formed optical image into an electrical signal. Various control values entered through the image input section 1 are stored in a backup storage section, described hereinafter.

Then, the image data converted into the electrical signal by the image input section 1 is further converted into a digital signal by an image processing section, not shown, and subjected to image processing including various correcting processes and user-designated processes. The resulting digital signal is then stored in an image memory, not shown. Various control values used by the image processing section are likewise stored in the backup storage section, described hereinafter.

Then, the image data stored in the image memory are read from the image memory and converted into an analog signal to be sent to the section 3. In the image forming section 3, the image data are amplified to a proper output value by an exposure control section, not shown, and then converted into an optical signal by the optical projector 11. That is, the optical signal is injected onto the photosensitive drum 12 through the polygon mirror 21, the lenses 22 and the reflecting mirror 23 to form an electrostatic latent image thereon. The electrostatic latent image is then visualized using toner, and transferred onto a recording sheet being fed from the sheet feed tray 14 or 15, the sheet feed deck 16, or the manual sheet-insertion tray 17, and further fixed onto a recording sheet by the fixing rollers 13 whereby the image data is recorded on the sheet. Recording sheets thus having the image data recorded thereon are then forwarded to the sorter 4 to be sorted out into the sheet discharge trays 20. Various control values used by the image forming section 3 are also stored in the backup storage section.

Thus, in this digital copying machine, image data is read from an original, the read image data is converted by the CCD 10 into pixels, the resulting image data in pixel form is subjected to required image processing, then the image-processed data is stored in the image memory, and the stored image data is sent to the image forming section 3 for reproduction on a recording sheet.

It is to be noted that the backup storage section keeps counting the number of copies and printouts produced.

Figure 2:
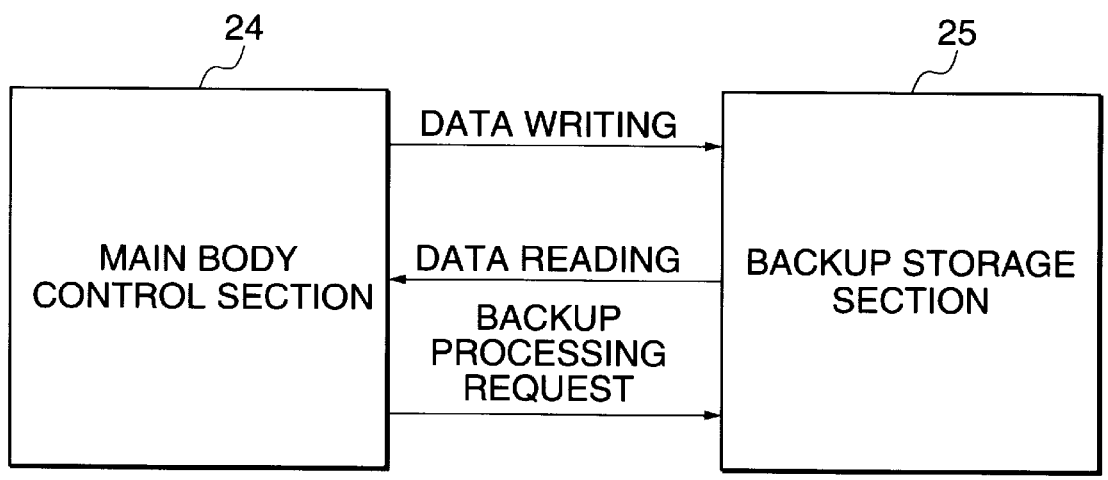
FIG. 2 is a block diagram showing the relationship between a main body control section and a backup storage section of the image forming apparatus.

FIG. 2 is a block diagram showing the relationship between a main body control section and the backup storage section.

That is, the main body control section 24 obtains the above-mentioned control values entered through the image input section 1 and used by the image processing section, and the image forming unit 3. Further, the backup storage section 25 has a mask ROM as a fixed read-only memory, a DRAM as a readable and writable volatile memory, and EEPROMs as nonvolatile memories. Various control values obtained by the main body control section 24 are written to or read from the DRAM within the backup storage section 25.

Further, the control values from the main body control section 24 can be transferred from the DRAM to the EEPROMs within the backup storage section 24 and backed up in the EEPROMs, or can be directly written to the EEPROMs from the main body control section 24.

Figure 3:
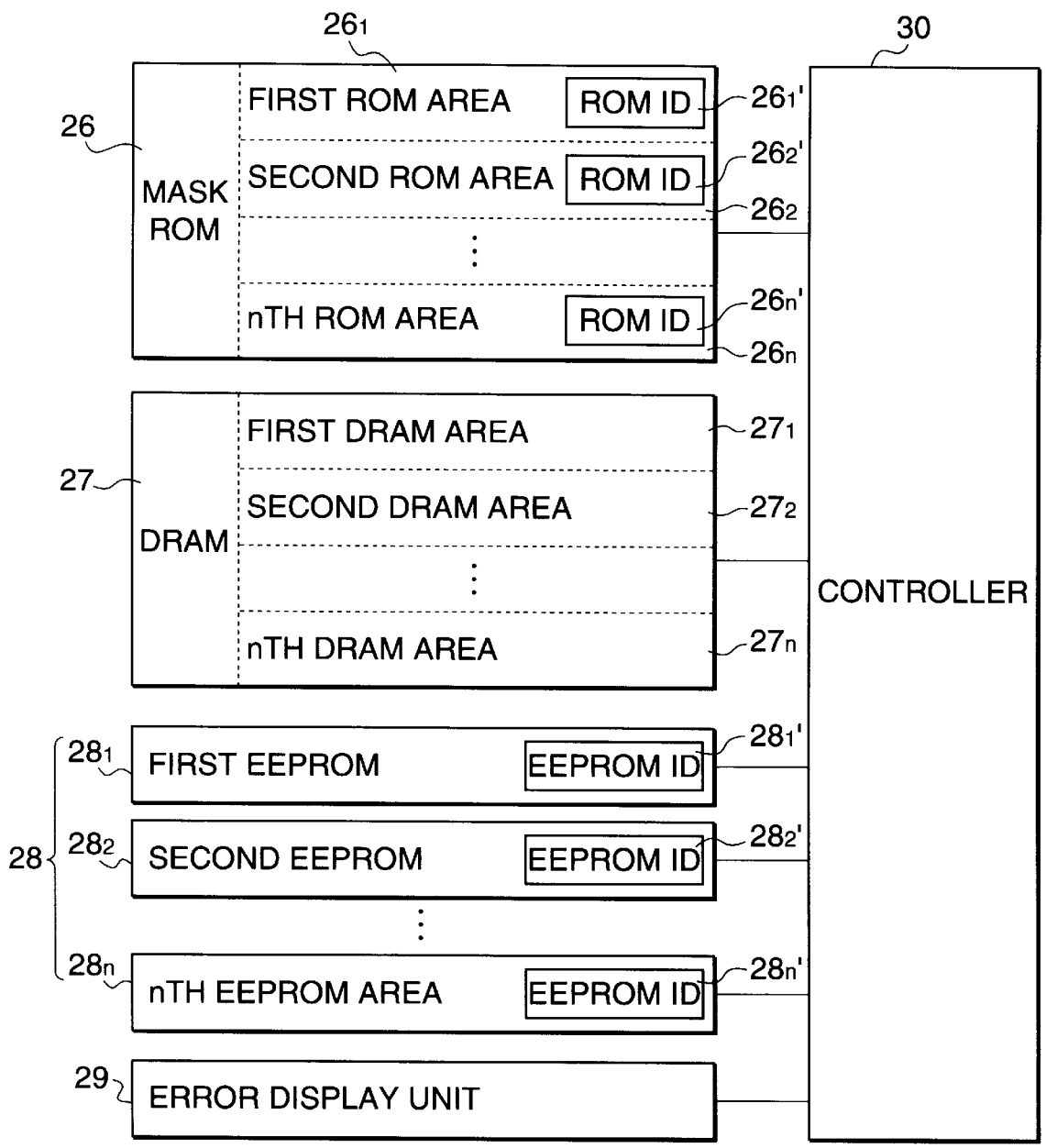
FIG. 3 is a block diagram showing the details of the backup storage section as a storage device according to the present invention.

FIG. 3 is a block diagram showing the details of the backup storage section 25. The backup storage section 25 is constructed such that the mask ROM 26, the DRAM 27, the EEPROMs 28, and an error display unit 29 are connected to a controller 30.

The EEPROMs 28 (first to nth EEPROMs $28_1$ to $28n$) are dismountably mounted in slots provided in the backup storage section 25, and these EEPROMs $28_1$ to $28_n$ have subareas $28_1'$ to $28_n'$ storing respective identification codes (ID). Each EEPROM 28 has a floating gate field-effect transistor, and stores 1-bit information by means of an electric charge stored in the floating gate. Thus, the EEPROM 28 can store and discharge an electric charge in the floating gate according to voltage applied to its floating gate field-effect transistor, whereby it can erase and write information electrically.

The mask ROM 26 has n ROM areas (first to nth ROM areas 26₁ to 26n) corresponding in number to the number of EEPROMs 28, and the ROM areas 26₁ to 26n have subareas 26₁' to 26n' storing respective ID codes.

The mask ROM 26 stores data by connecting a line to a power source or ground. Therefore, the mask ROM 26 is fabricated by preparing data for storage in the form of a mask in advance and then baking the data onto a wafer using a stepper. Although the mask ROM 26 does not allow the written data to be erased or rewritten for the above reason, it can operate basically with only an address selecting circuit, and therefore can be easily fabricated with a large storage capacity.

Further, the DRAM 27 has n DRAM areas (first to nth DRAM areas 27₁ to 27n) corresponding in number to the number of the EEPROMs 28, and each DRAM area has registers, not shown, for storing various flags, described hereinafter. These registers store an error flag Ferr indicative of whether or not the ID code of each of the EEPROMs 28₁ to 28n indicates abnormality of the EEPROM in question, an order flag Feeprom indicative of the ordinal number of each of the EEPROMs 28₁ to 28n, and also the ID code EEPROM ID of each of the EEPROMs 28₁ to 28n.

Each ID code has a desired, appropriate data length such as 8 or 16 bytes. The ID code storing subareas 26₁' to 26n' of the mask ROM 26 store correct data for determining whether the ID codes of the EEPROMs 28 are correct or not. When comparing the ID code of an EEPROM 28 with the correct data stored in its ID code storing subarea, the controller 30, when finding that the ID code of the EEPROM 28 in question contains even one wrong bit among the total data-length bits of the ID code, determines that stored data in the EEPROM 28 in question is destroyed. When the stored data in the EEPROM 28 in question is determined to be destroyed, the error display unit 29 displays an error message, informing the user that the stored data in the EEPROM 28 in question is destroyed.

The DRAM 27 is a device that stores information equivalent to 1 bit in the form of electric charge in a capacitor. Therefore, the bit is set to "1" when the capacitor stores electric charge, and "0" when it stores no electric charge, for example. On the other hand, when no voltage is applied to the capacitor, the electric charge stored in the capacitor decreases as time elapses, thereby no longer allowing the DRAM to hold its information. Therefore, the DRAM 27 requires periodic refreshment, i.e. storing electric charge again in the capacitor. Conversely speaking, the DRAM 27 needs no supply of power unless refreshed, meaning that the DRAM 27 can store a large volume of information at low power.

The controller 30 manages the mask ROM 26, the DRAM 27 and the EEPROMs 28, and controls data backup and restoring processes in response to data transfer requests and instructions from outside.

Figure 4:
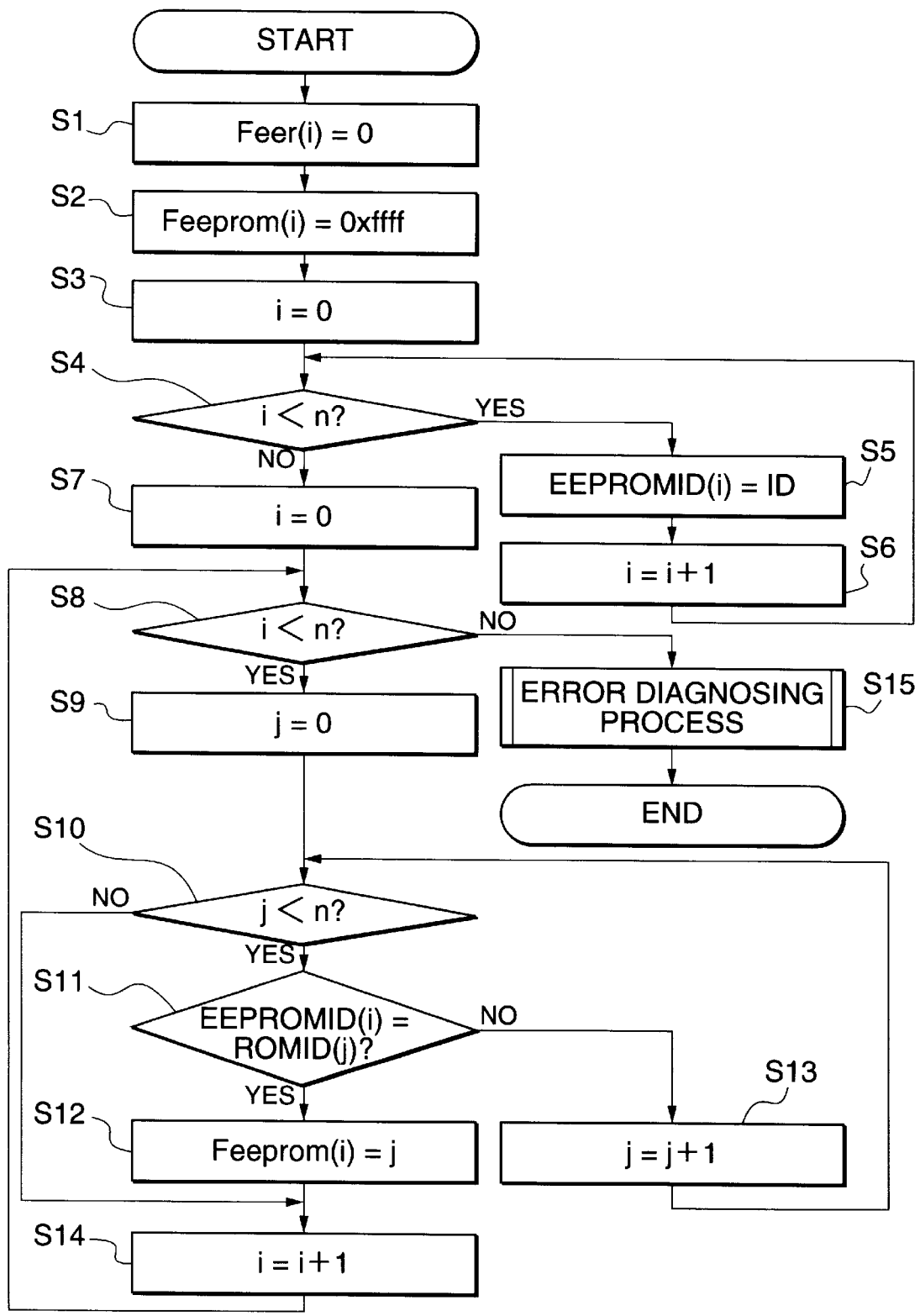
FIG. 4 is a flowchart showing a method of processing stored data according to an embodiment of the present invention.

FIG. 4 is a flowchart showing a method of processing stored data according to the present invention. This program is executed by the controller 30 of the backup storage section 25.

In a step S1, all the error flags Ferr stored in the registers 27₁' to 27n' in the areas 27₁ to 27n of the DRAM 27 are initialized to "0" and in a step S2, and the order flags Feeprom are initialized to a value that they cannot assume, for example, to "0xffff." In the following step 3, a variable i indicative of the ordinal number of each of the EEPROMs 28 is initialized to "0."

Next, at a step S4, it is determined whether or not the variable i is smaller than the number n of EEPROMs 28. Since the answer is "Yes" at the step S4 in the first loop, the process proceeds to a step S5, where the ID code EEPROM ID of the first EEPROM 28₁ is read and the read ID code EEPROM ID is loaded into the EEPROM ID register of the first DRAM area 27₁. At the following step S6, the variable i is incremented by "1", and then the process returns to the step S4, where the steps S5 and S6 are repeated until the answer becomes "No" at the step S4, i.e. until the variable i equals the number n of EEPROMs 28. When the variable i equals the number n of EEPROMs 28 so that the answer is "No" at the step S4, the process proceeds to a step S7, where the variable i is cleared to "0", and at the following step S8, it is determined whether or not the variable i is smaller than the number n of EEPROMs 28 similarly to the step S4.

When the answer is "Yes" at the step S8, the process proceeds to a step S9 to initialize a variable j indicative of the ordinal number of each of the ROM areas of the mask ROM 26 to "0", and at the following step S10, it is determined whether or not the variable j is smaller than the number n of EEPROMs 28. In the first loop, the answer is "Yes" at the step S10, and thus the process proceeds to a step S11, where it is determined whether or not the ID code EEPROM ID stored in the register of the first DRAM area 27₁ matches with an ID code ROM ID stored in the ID code storing subarea 26₁' of the first ROM area 26₁. If the answer is "Yes", a number (e.g. "0") corresponding to the variable j then assumed is loaded into the Feeprom register of the first DRAM area 27₁ as the order flag Feeprom, and then the process proceeds to a step S14.

On the other hand, when the answer is "No" at the step S11, i.e. when the above-mentioned ID code EEPROM ID does not match with the above-mentioned ID code ROM ID, the process proceeds to a step S13, where the variable j is incremented by "1", and then the process returns to the step S10 to repeat the above process.

Thus, when the ID code EEPROM ID stored in any of the EEPROM ID registers of the DRAM 27 matches with the ID code ROM ID in the mask ROM 26, a number corresponding to the variable j then assumed is loaded into the Feeprom register of a DRAM area 27 corresponding to the number as the order flag Feeprom, and then the process proceeds to the step S14.

At the step S14, the variable i is incremented by "1", and then the process returns to the step S8 to repeat the process described above.

Figure 5:
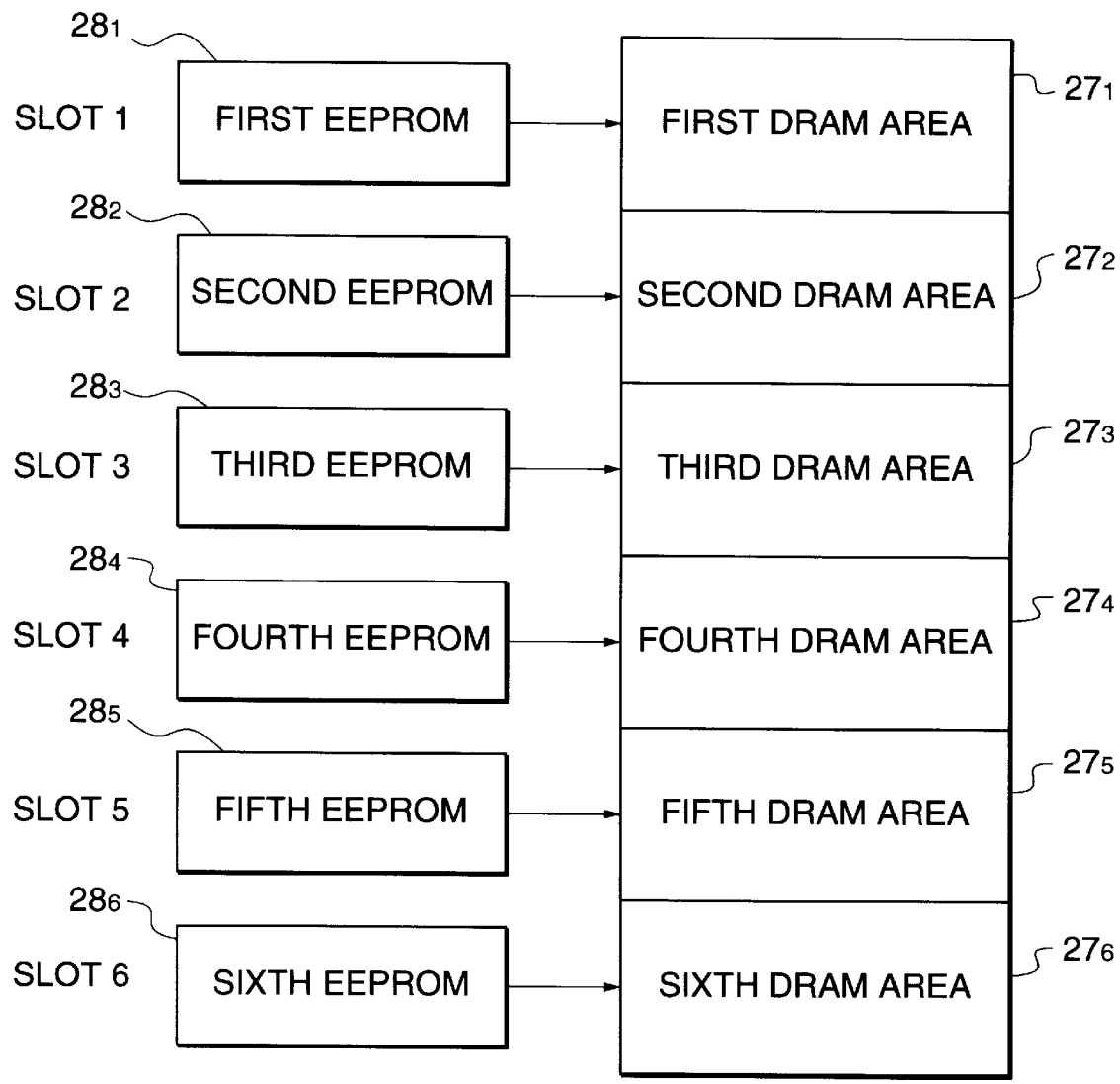
FIG. 5 is a diagram illustrating the expansion of data into a DRAM when EEPROMs are mounted in the backup storage section in a predetermined order.

FIG. 5 shows the case where each EEPROM 28 is normal, i.e. when the answer is always "Yes" at the step S11. In this case, the order in which the EEPROMs 28 are mounted in the slots corresponds to the order in which the DRAM areas of the DRAM 27 are numbered, so that the data stored in the EEPROMs 28 will be expanded onto the respective identically numbered DRAM areas 27₁–27n of the DRAM 27.

Figure 6:
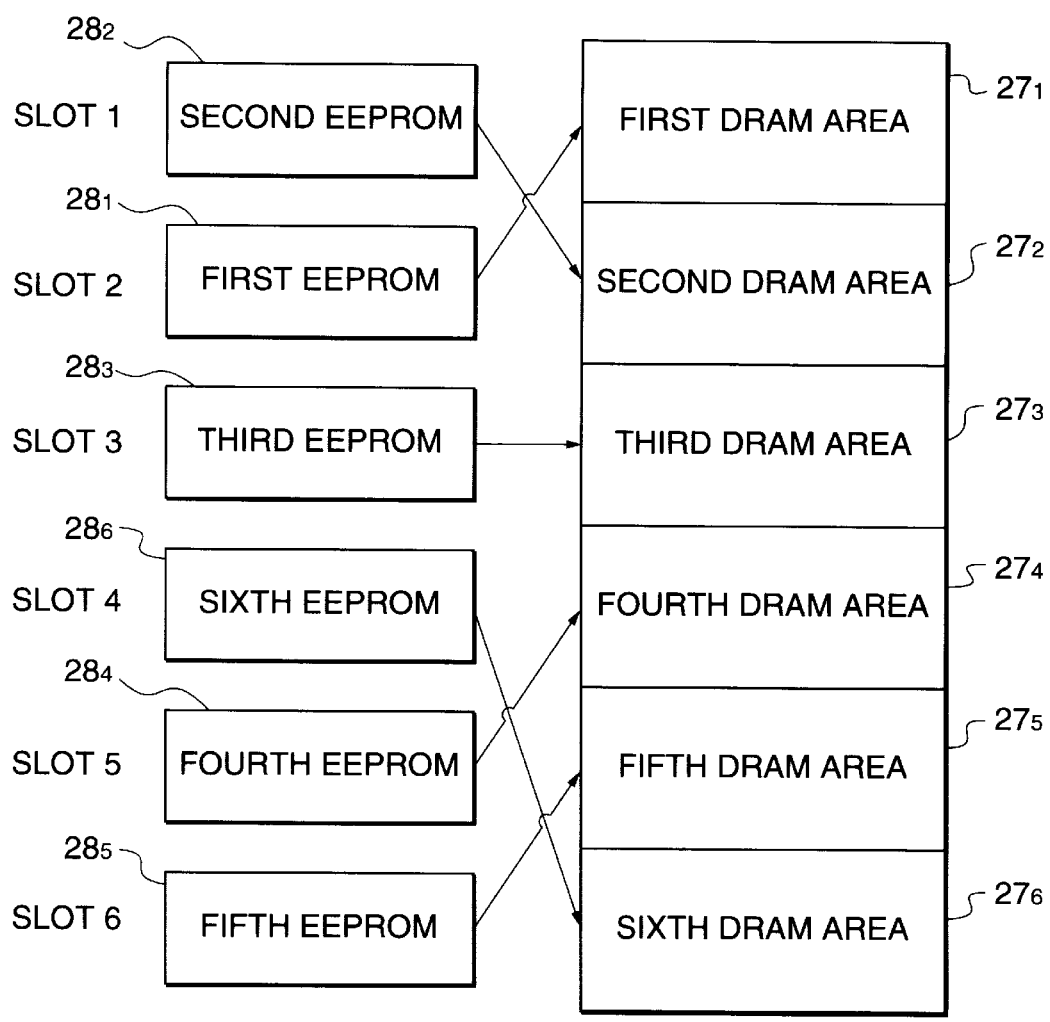
FIG. 6 is a diagram useful in explaining the expansion of data into a DRAM when EEPROMs are mounted in the backup storage section in a predetermined order.

On the other hand, FIG. 6 shows the case where the answer could be "No" at the step S11 since a serviceman has mounted the EEPROMs to the backup storage section 25 in an arbitrary order.

That is, referring back to the flowchart of FIG. 4, since the answer becomes "No" at the step S11 in the first loop, the variable j is incremented and the determination step S11 is executed again. If the ID code EEPROM ID matches with the ID code ROM ID at the same step, it is determined that the second EEPROM 28₂ is mounted in the slot 1, whereby the backup data stored in the second EEPROM 28₂ is expanded onto the second DRAM area 27₂.

Then, the variable i indicative of the ordinal number for the EEPROMs 28 is incremented by "1" and the variable j indicative of indicative of the ordinal number of each of the ROM areas of the mask ROM 26 is cleared to "0". When the answer is "Yes" at the step S11, it is determined that the first EEPROM 28₁ is mounted in the slot 2, whereby the backup data stored in the first EEPROM 28₁ is expanded onto the first DRAM area 27₁.

Further shown in FIG. 6 are cases where the third EEPROM 28₃ is mounted in the slot 3, the sixth EEPROM 28₆ in the slot 4, the fourth EEPROM 28₄ in the slot 5, and the fifth EEPROM 28₅ in the slot 6, respectively.

As described above, according to this embodiment, it is determined whether or not the ID codes of the plurality of EEPROMs 28 match with those stored in the storage areas of the DRAM 27, when external power supply is started, and backup data are expanded onto only such storage areas of the DRAM 27 of which the ID codes EEPROM ID match with the ID codes of the plurality of EEPROMs 28. Therefore, even if the EEPROMs are mounted in the storage device in an arbitrary order, the data can be restored to what they were, in the DRAM 27 in the same order as that before the interruption of the power source, thus preventing the image forming apparatus from being damaged, for example.

Further, in this embodiment, when the answer is "No" at the step S8, i.e., when the variable i equals the number n of the EEPROMs 28, the process jumps to a step S15 to execute an error diagnosing process, before the program is terminated.

Figure 7:
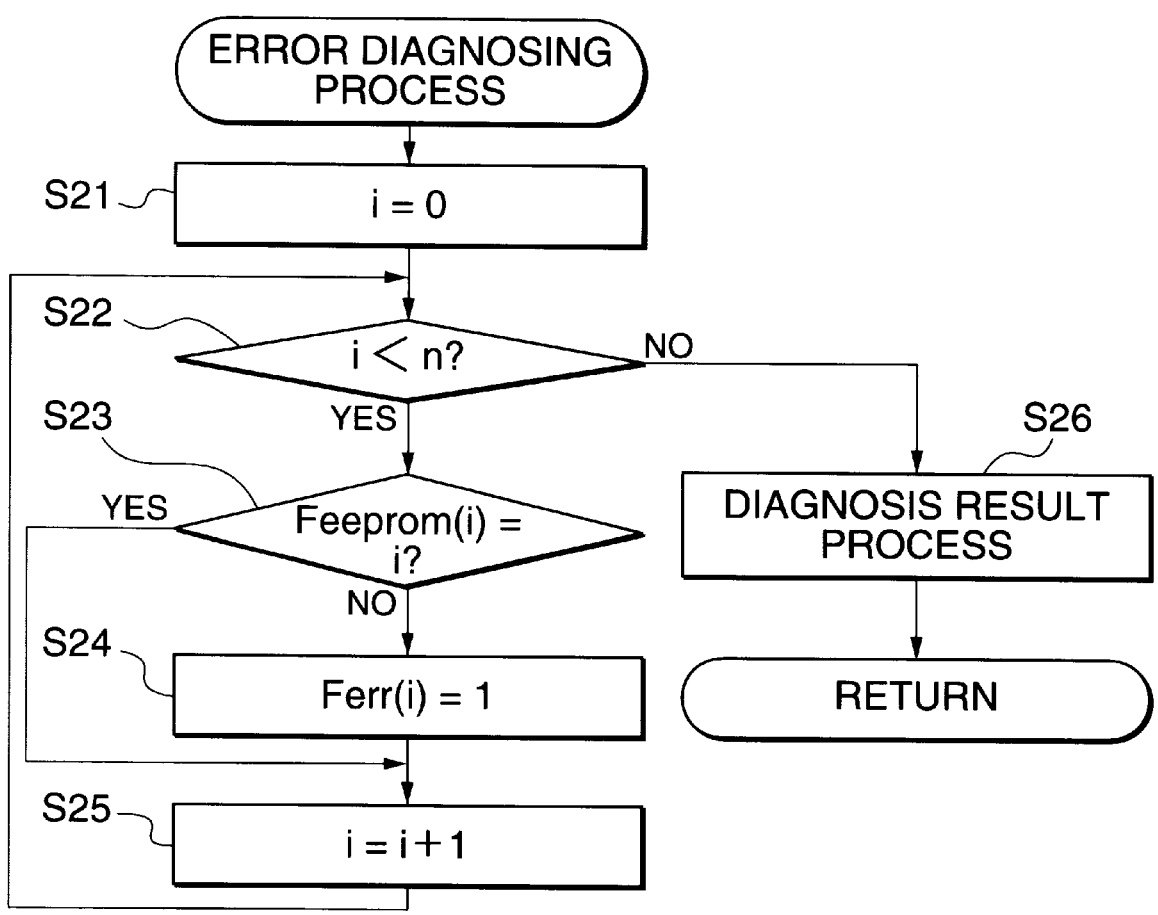
FIG. 7 is a flowchart showing the procedure of an error diagnosing process.

FIG. 7 is a flowchart showing the procedure of the error diagnosing process.

First, at a step S21, the variable i is initialized to "0" and, at the following step S22, it is determined whether or not the variable i is smaller than the number n of the EEPROMs 28.

In the first loop, the answer is "Yes" at the step S22, and then the process proceeds to a step S23, where it is determined whether or not the order flag Feeprom stored in the first DRAM area 27₁ of the DRAM is identical with the ordinal number of the first EEPROM 28₁. If the answer is "Yes," the process jumps to a step S25, determining that no error has occurred in the first EEPROM. On the other hand, if the answer is "No" at the step S23, the error flag Ferr stored in the first DRAM area 27₁ is set to "1" to indicate that the first EEPROM 28₁ is abnormal for some reason, and then the process proceeds to the step S25.

At the step S25, the variable i is incremented by "1" and the process returns to the step S22 to repeat the above described process. Upon completion of the error diagnosing process for all the EEPROMs 28, the diagnosis results (determination results) are displayed at a step S26, and then the process returns to the main routine of FIG. 4.

That is, at the step S26, if an error flag Ferr is "0", it is determined that the corresponding EEPROM 28 is normal, and thus the stored data is transferred from the EEPROM 28 to the DRAM 27. On the other hand, if an error flag Ferr is "1", it is determined that the corresponding EEPROM 28 is abnormal, a message is displayed on the error display unit 29 and/or an alarming buzzer is sounded to inform the user of the abnormality of the EEPROM 28. Thus, when data in any of the plurality of EEPROMs 28 is destroyed, the EEPROM containing the destroyed data can be located easily.

It should be noted that the present invention is not limited to the above described embodiment. For example, an SRAM may be used in place of the DRAM 27. The SRAM is a device that is composed of a plurality of transistors to form a flip-flop, for example and stores information equivalent to 1 bit. Since thus only transistors are used for storing information, the SRAM can read and write data at higher speed than the DRAM.

While the present invention has been described with reference to some preferred embodiments thereof, it is apparent that the present invention is not limited to them, but various modifications and applications can be made within the scope of the claims appended hereto.

What is claimed is:

1. A storage device comprising:
   first read-only storage means for use in reading stored data;
   second storage means formed of a volatile memory and capable of reading data stored therein and writing data thereinto;
   a plurality of third storage means formed of nonvolatile memories for holding the data stored in said second storage means as backup data;
   each of said plurality of third storage means has an identifier unique thereto, and each of said first and second storage means is divided into a plurality of divided storage areas corresponding at least to a number of third storage means, each of said divided storage areas having an identifier unique thereto;
   loading means for loading said identifiers unique to said plurality of third storage means into said divided storage areas of said second storage means;
   collating means for collating each of said identifiers unique to said third storage means stored in said second storage means with each of said identifiers unique to said divided storage areas of said first storage means; and
   stored data transfer means operable when said collating means determines that one of said identifiers unique to said third storage means matches with one of said identifiers unique to said divided storage areas of said first storage means, for transferring contents in said third storage means which are related to said one of said identifiers unique to said third storage means to one of said divided storage areas of said second storage means which has an identifier identical with said one of said identifiers unique to said third storage means.

2. A storage device according to claim 1, wherein said collating means sequentially collates said identifiers unique to said third storage means stored in said second storage means with said identifiers unique to said divided storage areas of said first storage means.

3. A storage device according to claim 1, comprising an abnormality diagnosing means for determining whether or not any of said plurality of third storage means is abnormal, upon completion of collation of all of said identifiers unique to said third storage means with all of said identifiers unique to said divided storage areas of said first storage means by said collating means.

4. A storage device according to claim 3, wherein said abnormality diagnosing means comprises determining means for determining whether or not stored data in one of said divided storage areas of said second storage means matches with the identifier of a corresponding one of said plurality of third storage means, and abnormality determining means for determining that the corresponding one of said plurality of third storage means is abnormal when a result of the determination made by said determining means is negative.

5. A storage device according to claim 3, comprising display means for displaying a result of the determination made by said abnormal diagnosing means.

6. A storage device according to claim 3, comprising an alarming means for sounding an alarm when said abnormality diagnosing means determines that any of said plurality of third storage means is abnormal.

7. A storage device according to claim 1, wherein said storage device has a main body, and said plurality of third storage means are dismountably mounted in said main body of said storage device.

8. A method of processing stored data in a storage device including first read-only storage means for use in reading stored data, second storage means formed of a volatile memory and capable of reading data stored therein and writing data thereto, a plurality of third storage means formed of nonvolatile memories for holding the data stored in said second storage means as backup data, each of said plurality of third storage means has an identifier unique thereto, and each of said first and second storage means is divided into a plurality of divided storage areas corresponding at least to a number of third storage means, each of said divided storage areas having an identifier unique thereto, the method comprising:

a loading step of loading said identifiers unique to said plurality of third storage means into said divided storage areas of said second storage means;

a collating step of collating each of said identifiers unique to said third storage means stored in said second storage means with each of said identifiers unique to said divided storage areas of said first storage means; and a stored data transfer step of transferring contents in said third storage means which are related to one of said identifiers unique to said third storage means to one of said divided storage areas of said second storage means which has an identifier identical with said one of said identifiers unique to said third storage means when it is determined in said collating step that said one of said identifiers unique to said third storage means matches with said one of said identifiers unique to said divided storage areas of said first storage means.

9. A method of processing stored data according to claim 8, wherein said collating step comprises sequentially collating said identifiers unique to said third storage means stored in said second storage means with said identifiers unique to said divided storage areas of said first storage means.

10. A method of processing stored data according to claim 8, comprising an abnormality diagnosing step of determining whether or not any of said plurality of third storage means is abnormal, upon completion of collation of all of said identifiers unique to said third storage means with all of said identifiers unique to said divided storage areas of said first storage means by said collating step.

11. A method of processing stored data according to claim 10, wherein said abnormality diagnosing step comprises a determining step of determining whether or not stored data in one of said divided storage areas of said second storage means matches with the identifier of a corresponding one of said plurality of third storage means, and an abnormality determining step of determining that the corresponding one of said plurality of third storage means is abnormal when a result of the determination made by said determining step is negative.

12. A method of processing stored data according to claim 10, comprising a display step of displaying a result of the determination made by said abnormal diagnosing step.

13. A method of processing stored data according to claim 10, comprising an alarming step of sounding an alarm when it is determined in said abnormality diagnosing step that any of said plurality of third storage means is abnormal.

14. A method of processing stored data according to claim 8, wherein said storage device has a main body, and said plurality of third storage means are dismountably mounted in said main body of said storage device.

15. An image forming apparatus comprising a storage device according to claim 1.

* * * * *